Patented Apr. 14, 1936

2,037,196

UNITED STATES PATENT OFFICE 2,037,196

MIXTURE OF AND METHOD OF ADMIXING SODIUM MORRHUATE AND QUININE SOLUTION

Frederick R. Greenbaum, Philadelphia, Pa., assignor to The National Drug Company, Philadelphia, Pa., a corporation of Pennsylvania No Drawing. Application April 25, 1934, Serial No. 722,401

1 Claim. (Cl. 167—67)

The object of the invention is to provide a satisfactory clear mixture of sodium morrhuate and a suitable quinine solution under commercial conditions, such mixture being free from any precipitate, and to provide a process for commercially producing such new improved mixture.

A further object is to provide a mixture of sodium morrhuate and a suitable quinine solution, together with a substance which will lend to the mixture the characteristics of an anesthetic, when the mixture is injected intravenously into a patient.

It is well known that in the obliterative treatment of varicose veins by means of injections, two substances are recognized as being of outstanding merit, as evidenced by the excellent results obtained from their use. These substances comprise sodium morrhuate and quinine in the form of either quinine urethane or quinine urea hydrochloride. These substances as before mentioned produce excellent obliterative results, while injections of them do not produce resulting pain or cramp, and neither will they produce slough in the event that extravasation should accidentally occur.

The medical profession frequently meets with relatively obstinate cases, in which the sclerosing action of either one or the other of the above-mentioned substances proves insufficient to produce the desired results, wherefore it occurred to me that a combination of the two substances might conceivably produce a better action, upon the theory that the action of one would enhance or augment the action of the other. However, I well realized that chemically it is considered impossible to produce a solution of sodium morrhuate in combination with either quinine urethane or quinine urea hydrochloride, the reason being that in these products quinine hydrochloride is used, and as a result of the acid reaction of each of the salts, quinine urethane or quinine urea hydrochloride, a portion of the sodium morrhuate is neutralized, precipitating the fatty acids of the latter and producing a cloudy solution, which is entirely unfit for clinical uses.

It therefore became obvious that a method of combining the two substances would have to be developed, in order to obtain the compound sought. For this purpose, I restorted to quinine alkaloid, which being of a relatively weak basic nature is compatible with and will very slowly dissolve to the extent of about two (2%) percent in a hot five to ten percent solution of sodium morrhuate, but is even less soluble in said solution when cold.

This method of mixing the quinine alkaloid with the sodium morrhuate, however, is too slow for commercial purposes, besides the fact that while the quinine alkaloid is retained in solution, the free alkaloid is precipitated, making the mixture unfit for clinical use. It therefore became necessary to employ some solvent suitable for dissolving and combining both the quinine alkaloid and the sodium morrhuate in a resulting clear solution, and if possible to find such a solvent as would also contribute an anesthetic characteristic to the final mixture.

After considerable experimenting, and without enumerating earlier failures, I finally discovered the fact that both of the substances mentioned are relatively slowly soluble in cold benzyl alcohol, but are rapidly and completely soluble in benzyl alcohol when heated, and that the resulting clear solution possesses a distinct and positively active anesthetic characteristic. By way of example, I then found that the desired solution can be obtained by dissolving twenty grams (20 grs.) of free alkaloid quinine in twenty cubic centimeters (20 cc.) of (preferably hot) benzyl alcohol, and this solution added slowly and with constant stirring to 1,000 cubic centimeters of a five percent (5%) aqueous solution of sodium morrhuate, heated to and maintained close to the boiling point. Gradually the alkaloid quinine and benzyl alcohol solution become dissolved in the sodium morrhuate solution, during the steady addition of one to the other and with constant mechanical stirring. Finally, a clear solution is obtained, containing between five percent (5%) and ten percent (10%) sodium morruhate, two percent (2%) alkaloid quinine, and two percent (2%) benzyl alcohol.

Clinically it has been found that the mixture of sodium morrhuate and quinine alkaloid by this process results in a greater uniformity, together with a higher percentage of perfect results in the enchanced obliterative action upon the varicose veins, angiomatous tumors, hemorrhoids, varicocele, fissure and abnormal tissue growths, as compared with any single component substance alone, while a local anesthetic action is evidenced in the case of each injection.

Having produced the improved mixture of sodium morrhuate, quinine alkaloid and benzyl alcohol or other suitable solvent by the foregoing process, the benzyl alcohol may be then or at any time thereafter distilled off, so as to leave an equally clear mixture of the sodium morrhuate and quinine alkaloid alone, both for use as a simple mixture where such is desired, or as a commercial basis for still other mixtures and/or compounds with one or more still further substances, depending upon what ultimate preparation or result is desired.

In the foregoing description and in the appended claim, the term "mixture" is employed, because of the fact that at this time it is not definitely or accurately known that a chemical compound results from the admixture of the substances specified, wherefore in the event of more positive proof which may develop during the prosecution of this application, the right is reserved to so revise said description and claim, as to make it more truly representative of the facts involved, but possibly not fully understood at this time.

Having thus described my invention what I claim as new and desire to secure by Letters Patent, is:—

A pharmaceutical mixture of sodium morrhuate, quinine alkaloid, and benzyl alcohol, in solution.

FREDERICK R. GREENBAUM.